United States Patent
Baca et al.

(10) Patent No.: US 11,027,196 B2
(45) Date of Patent: Jun. 8, 2021

(54) SYSTEM AND METHOD FOR MANAGING TRANSACTIONS IN A MULTIPLAYER NETWORK GAMING ENVIRONMENT

(71) Applicant: TAKE-TWO INTERACTIVE SOFTWARE, INC., New York, NY (US)

(72) Inventors: Kevin Baca, Carlsbad, CA (US); Chris Mueller, Carlsbad, CA (US)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 0 days.

(21) Appl. No.: 16/560,846

(22) Filed: Sep. 4, 2019

(65) Prior Publication Data

US 2021/0060426 A1 Mar. 4, 2021

(51) Int. Cl.
| | | |
|---|---|---|
| *A63F 13/00* | (2014.01) | |
| *A63F 13/35* | (2014.01) | |
| *G06F 9/54* | (2006.01) | |
| *A63F 13/73* | (2014.01) | |

(52) U.S. Cl.
CPC ............. *A63F 13/35* (2014.09); *A63F 13/73* (2014.09); *G06F 9/547* (2013.01)

(58) Field of Classification Search
None
See application file for complete search history.

(56) References Cited

U.S. PATENT DOCUMENTS

| | | | | |
|---|---|---|---|---|
| 8,051,491 B1* | 11/2011 | Cavage | ................. | H04L 63/10 726/30 |
| 8,180,891 B1* | 5/2012 | Harrison | ................. | G06F 3/14 709/224 |
| 2003/0177187 A1* | 9/2003 | Levine | ................. | A63F 13/10 709/205 |
| 2007/0067104 A1* | 3/2007 | Mays | ................. | G01C 21/3647 701/437 |
| 2007/0171921 A1* | 7/2007 | Wookey | ................. | G06F 9/5027 370/401 |
| 2008/0062891 A1* | 3/2008 | Van der Merwe | ...... | H04L 45/04 370/254 |
| 2010/0198698 A1* | 8/2010 | Raleigh | ................. | H04L 67/04 705/26.1 |
| 2011/0157196 A1* | 6/2011 | Nave | ................. | A63F 13/358 345/522 |
| 2013/0173633 A1* | 7/2013 | Piepgrass | .......... | G06F 16/24578 707/748 |
| 2014/0109174 A1* | 4/2014 | Barton | ............. | H04W 12/0027 726/1 |
| 2015/0033305 A1* | 1/2015 | Shear | ................. | G06F 21/53 726/6 |
| 2015/0100476 A1* | 4/2015 | Agapitov | ................. | A63F 13/85 705/39 |
| 2015/0126282 A1* | 5/2015 | Hitomi | ................. | A63F 13/355 463/42 |
| 2016/0021132 A1* | 1/2016 | Sheppard | ............ | H04L 63/1425 726/23 |

(Continued)

*Primary Examiner* — Paul A D'Agostino
(74) *Attorney, Agent, or Firm* — Orrick, Herrington & Sutcliffe LLP (57) ABSTRACT

A system and method for detecting and managing electronic transactions and providing a domain specific collection of remotely callable functions in a video game environment.

20 Claims, 6 Drawing Sheets

(56) References Cited

U.S. PATENT DOCUMENTS

| | | | |
|---|---|---|---|
| 2016/0027076 A1* | 1/2016 | Jackson | H04L 65/403 |
| | | | 709/217 |
| 2016/0110537 A1* | 4/2016 | Harrison | G06F 21/53 |
| | | | 705/14.66 |
| 2016/0112402 A1* | 4/2016 | Schwartz | H04L 67/02 |
| | | | 726/8 |
| 2016/0227265 A1* | 8/2016 | Harrison | H04L 65/00 |
| 2017/0126614 A1* | 5/2017 | Sinha | H04L 51/36 |
| 2017/0169248 A1* | 6/2017 | Darcy | G06Q 30/0207 |
| 2017/0171580 A1* | 6/2017 | Hirsch | H04N 21/6125 |
| 2018/0025586 A1* | 1/2018 | Lockton | A63F 13/828 |
| | | | 463/42 |
| 2018/0227128 A1* | 8/2018 | Church | H04L 63/0853 |
| 2019/0034235 A1* | 1/2019 | Yang | G06F 21/604 |
| 2019/0042867 A1* | 2/2019 | Chen | G06N 5/022 |
| 2019/0103968 A1* | 4/2019 | Srinivasan | G06F 21/41 |
| 2019/0320038 A1* | 10/2019 | Walsh | H04L 67/10 |
| 2020/0034470 A1* | 1/2020 | Manoharan | G06F 16/217 |

* cited by examiner

SYSTEM AND METHOD FOR MANAGING TRANSACTIONS IN A MULTIPLAYER NETWORK GAMING ENVIRONMENT

FIELD

The present disclosure relates generally to video games, including methods and systems to implement the same, and more specifically, but not exclusively, to systems and methods for decomposing a video game application into different smaller services to improve modularity and make the application easier to understand, develop, and test.

BACKGROUND

Conventional computer games are often developed as a monolithic application. Services provided by the monolithic application are largely homogeneous across all titles and platforms. In other words, each game title is presented with essentially the same service interface as any other game title. Although wrapped in a single monolithic application, most of these services are independent and unrelated.

As a monolithic application, these conventional game programs are designed without modularity. For example, it is difficult for game developers to implement custom functionality for one title without also exposing it for all other titles. In other words, a first title A might require transactions involving virtual animal characters while a second title B might require transactions involving virtual vehicles. Exposing the interfaces of the first title A to the second title B triggers not only a development risk (e.g., due to compatibility), but also a security risk (e.g., a vulnerability in one title can be used for the other title, thereby increasing attack surface). Because independent and unrelated services are wrapped in a single monolithic application, all functionality must be exposed to all titles, regardless of whether some functionality is used by one title. It is difficult to add game-specific functionality to disparate services shared by all games.

Typically, these services are based on conventional application communication protocols (e.g., Hypertext Transfer Protocol (HTTP)), which are stateless. In other words, states cannot be maintained between one connection and the next. For example, each transaction request requires a new connection between the client and a server. Each new connection might be handled by a different server due to load balancing of the server management. Accordingly, there is no dedicated server that maintains a state for any given player/client device. Instead, states are maintained by a remote database that is accessible to all servers. However remote databases not only add latency, but also create a single point of failure. One low-level problem in a remote database can propagate to other services and cause problems for unrelated system logic. If one database fails, all services are unavailable for all players. The entire server must be taken completely off-line to fix the problem.

Because each request is handled by a different server, it is even more difficult to maintain states for a group of related players. Accordingly, there are additional challenges with providing services to players in the same multiplayer session. For example, a global state is difficult to maintain when such a variable is distributed for session membership, mission progress, checkpoints, loot, non-player characters, and so on in a multiplayer game. Without a centralized state, maintaining cohesion among player groups (e.g., keeping friends and groups together). Inter-player transactions are also difficult and less reliable when physically distributed across distinct servers.

These conventional connections are also not persistent. Therefore, the conventional servers cannot send unsolicited messages to clients. Unsolicited messages can include invitations between players to join sessions and notifications to players about changes in state variables (e.g., cash gifts).

As a further disadvantage, monolithic approaches cannot distribute services globally for redundancy or latency minimization. Distributing services require duplicating the platform in its entirety, including all software and hardware components. However, synchronizing data between duplicate platforms is nearly intractable.

As another disadvantage, it is difficult to provide resources for monolithic applications based on individual application performance requirements. For example, leaderboards may require more processing power than arranging players into group parties. However, because everything is contained in a single application, it is not possible to allocate more resources to leaderboards without allocating more resources to parties.

Accordingly, there is a need for systems and methods for managing transactions and providing services in online games in an effort to overcome the aforementioned obstacles and deficiencies of conventional video game systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF PREFERRED EMBODIMENTS

Many currently-available videogames are deficient because they rely on a single application or single architectural entity for managing various transactions in a game. For example, a single server represents both transactions in a game as well as maintenance of a session. A system that allocates servers for a domain specific collection of remotely callable functions can prove desirable and provide a way to maintain persistent connections between servers and clients, provide tightly bound functionality for a specific domain, maintain real time states for players, facilitate global distribution of resources, and enable precise resource provisioning for a wide range of video game applications. This result can be achieved, according to one embodiment disclosed herein, by a game server system 100 as illustrated in FIG. 1.

Figure 1:
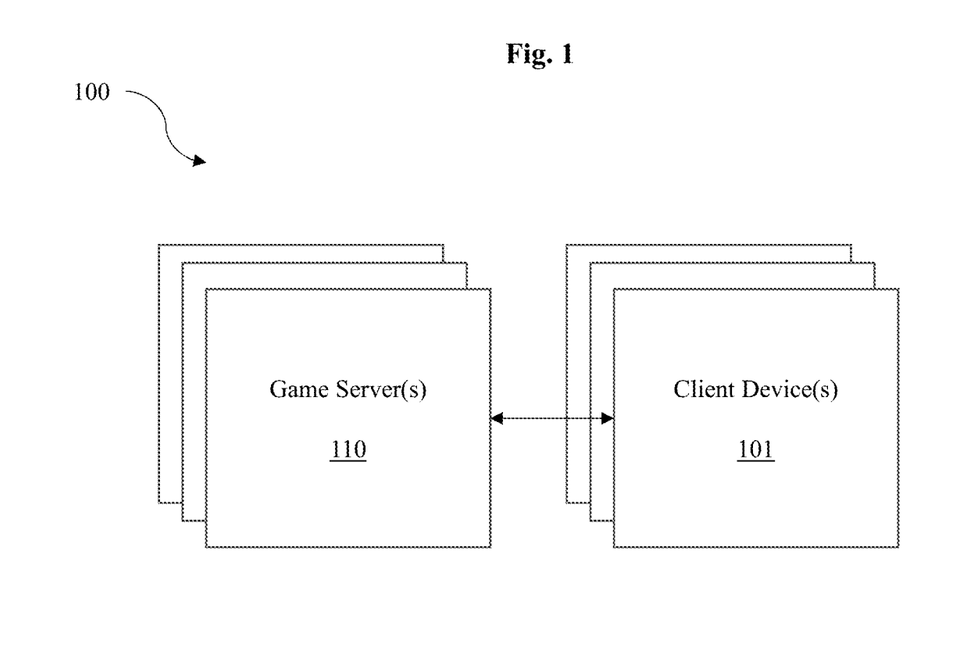
FIG. 1 is an exemplary top-level block diagram illustrating one embodiment of a game server.

Turning to FIG. 1, the game server system 100 includes one or more game servers 110 in communication with one or more client devices 101. The client devices 101 generally comprise gaming devices, non-limiting examples of which include personal computers (PCs), mobile platforms, virtual reality (VR) systems, augmented reality (AR) systems, gaming consoles running game software, and/or combinations thereof. These client devices 101 typically have memory, a central processing unit (CPU), graphics processing, operating system software, and network interfaces as is known in the art.

Each of the game servers 110 represent a collection of components that together present a selection of domain specific applications. For example, each game server 110 can be dedicated to a specific domain, such as player inventory management, a poker game, multiplayer matchmaking, and so on. Advantageously, the services can be deployed and managed independently, thereby providing more options for scaling, loading, and maintaining applications separately. The individual services are modularized to support reuse of application logic and facilitate maintenance by allowing repair or replacement of individual parts without requiring wholesale replacement.

In a preferred embodiment, one or more game servers 110 are used to provide a remote procedure call (RPC) interface that supports several modes of communication. For example, the client devices 101 can call functions on a selected game server 110, passing parameters and receiving return values. Each game server 110 can call functions on clients. The client devices 101 can send notifications to servers, such as "fire and forget" messages for which no response is expected. Similarly, the game servers 110 can send notifications to the client devices 101. Typically, the client devices 101 maintain a persistent connection to a selected game server 110 for the duration of a network session. Other modes of communication supported by the RPC interface include HyperText Transfer Protocol (HTTP)/HTTP Secure (HTTPS) interfaces for domains that do not require persistent connections, or for devices that do not support persistent connections.

In describing the present systems and methods, the following concepts will be used.

Sandbox Application—a collection of hardware and/or software that implements domain logic for a specific service (e.g., an Inventory application or Poker application)

Sandbox View—a single sandbox application can support multiple views, one for each type of client (e.g., game clients, web browser clients, mobile clients, administrative clients)

Multiplexing—enables multiple channels of unrelated communication over a single network connection Conductor—manages access and provides routing to game servers Pod—a collection of components required for operating one or more game server instances RPC—remote procedure call, which represents a networking protocol in which messages invoke functions on remote hosts External Cache—a high performance server on a high speed network which provides cross-server access to commonly used data Services/game transactions—services that can include shop transactions (e.g., exchanging virtual currency for a weapon in a game), session management, anti-cheating policies, bounty transactions, mini-game logic (e.g., content logic that can be migrated to the server rather than a session host), and so on.

Access Token—an encrypted chunk of tamper-proof data identifying a player and a sandbox application which is used to gain access to game servers Authentication Ticket—similar to an access token, contains encrypted data identifying players and access privileges, but used to access services/game transactions Client devices 101 (e.g., end-user game consoles) can connect to one or more of the game servers 110 for executing a particular transaction. In a preferred embodiment, a selected client device 101 maintains a persistent connection to one or more sandbox gateways. Advantageously, this enables not only client to server messages, but also server to client messages. Servers can thereby notify a player in real-time when, for example, they've been granted a gift via an administrator, or an item has been purchased via a web browser while simultaneously playing the game.

Game servers 110 each include external and internal components. Internal components are required for the game server to implement its core functionality. As used herein, the terms game server, sandbox, and sandbox application can be used interchangeably as desired. Most commonly, these terms all refer to the sandbox application. External components are not required for core game functionality and can also include internal components. By way of example, external components can refer to a database server, a cache server, a network switch, a network firewall, a network load balancer, and/or the like.

Figure 2:
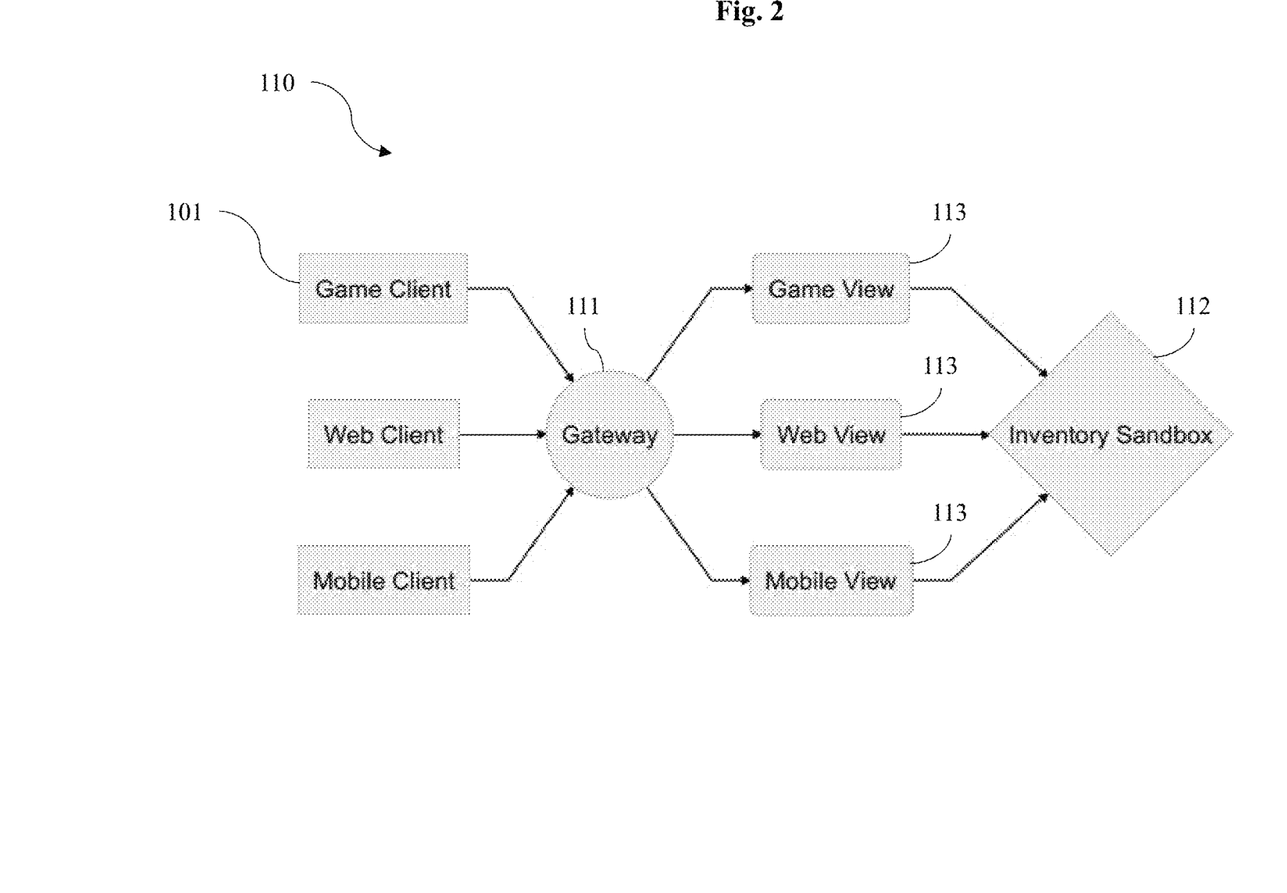
FIG. 2 is an exemplary top-level block diagram illustrating one embodiment of the game server of FIG. 1.

Turning to FIG. 2, an exemplary game server 110 is shown. As shown, the game server 110 can include a gateway 111, one or more sandbox applications 112 (e.g., an inventory sandbox as shown), and a database for persistent storage (optional and not shown). The gateway 111 represents a network facing server, which hosts one or more sandbox applications 112 and routes RPC messages from client devices 101 to sandboxes. In other words, the gateway 111 is a server process responsible for hosting one or more sandbox applications 112 and maintaining a persistent network connection to the client devices 101.

The gateway 111 can include a network facing address (e.g., Internet protocol address and uniform resource locator (URL)). When a selected client device 101 connects to a sandbox application, the selected client device 101 accesses the gateway 111 using the network facing address. The gateway 111 accepts RPC messages from the client devices 101 and routes the messages to sandbox applications using information in RPC message headers. By way of example, RPC messages can use any number of protocols, such as shown in the following exemplary excerpt from a JSON message: {"jsonrpc":"2.0", "id": "ac8ba4a132bf4e4eb901bfd54e6965e1", "method":"GetFoo", "params": {"request": {"fooId": "f2b4734d69774f7bbaf1dc77fde74537" } } }. Although an example is shown using JSON, those of ordinary skill in the art will appreciate that any protocol—including binary—can be used to route RPC messages. Through a single network connection, the client device 101 can communicate with multiple sandboxes hosted on a gateway by multiplexing RPC messages.

In some embodiments, gateway servers can run as one process per physical machine, or many processes per physical machine, depending on resource utilization and other factors. For example, other factors can include hardware memory and/or central processing unit (CPU) configuration (e.g., on a multi-CPU system, it can be advantageous to run one gateway per CPU compared to one gateway across multiple CPUs) and/or deployment strategy (e.g., during deployment, it can be advantageous to run a new gateway process to accept new connections, while simultaneously draining old connections from a previous gateway process). In either case, each gateway process can have a unique network facing address.

The sandbox application 112 implements logic for a specific domain or service (e.g., an inventory application or a poker application). Advantageously, each sandbox application 112 implements a dedicated set of functionality specific to a particular domain. For example, a selected sandbox application 112 can be dedicated solely to the game of poker or backgammon. These sandbox applications 112 can be hosted behind the same gateway 111 on the same physical machine. Or the sandbox applications 112 can be hosted on completely separate gateways, on separate machines, and in separate datacenters. This advantageously enables flexibility for resource provisioning and scaling. Although shown and described in FIG. 2 as an inventory sandbox for illustrative purposes only, the sandbox application can also include any domain logic for a specific service as desired without limitation. Examples of additional sandbox applications can include domain logic for inventory, bounty, anti-cheat, mini-games (e.g., poker, backgammon, and five finger filet), session/matchmaking, real-time messaging, authentication, player statistics, economy transactions, social networking, content sharing, and so on.

The sandbox application 112 can be isolated (or "sandboxed") from other sandbox applications 112 running on the same physical machine behind the same gateway 111. Each sandbox application 112 uses resources (e.g., memory, central processing unit (CPU), bandwidth) which can be isolated and monitored separately from other sandboxes on the same physical machine. The sandbox application 112 can run in the same process as the gateway process or in a separate process as desired. In either case, the gateway 111 and the sandbox application 112 it hosts runs on the same physical machine.

A single sandbox application 112 can support multiple views 113, such as shown in FIG. 2, with each view intended for a different type of client device 101. In some embodiments, the sandbox view 113 can be analogous to a page on a web site. Within a single site, desktop clients can see different pages than a mobile client. For example, desktop-oriented views can be higher resolution and include more electronic data, whereas mobile-oriented views can be more compact and include less data. Each view can access the same data and present it in a different way. Similarly, game server clients may receive different sandbox views—but each view accesses the same underlying data. By way of example, an inventory application can support a richer set of functions for game clients than for web or mobile clients. In some cases, game clients can buy and sell items; however, web and mobile clients may be limited to browsing existing inventory.

As a benefit of maintaining persistent connections between client devices 101 and game servers 110, game servers 110 can maintain in-memory electronic state information about connected players (e.g., connected client devices 101). In-memory state facilitates complex high performance logic that would be difficult if stored in a remote database. For example, in-memory state facilitates inventory transaction validation (e.g., constraints, limits, funds validation, and so on), mini-game game states (e.g., poker pot, hands, backgammon state, and so on), and/or individual session membership as players enter and leave the virtual session.

Additionally and/or alternatively, for long term state persistence, the game servers 110 can use a remote database (e.g., SQL servers) as desired. For example, some game servers 110 require long term state to preserve game data after an extended absence (e.g., an inventory server can maintain virtual inventory long after the player has left the game). By way of comparison, session servers and mini-game servers do not require long term state persistence because sessions/poker game variables are ephemeral and continuously changing. Those game servers 110 that require long term state information can use "sticky routing" to ensure players always connected to the selected game server 110 when their data is stored, as described herein.

Figure 3:
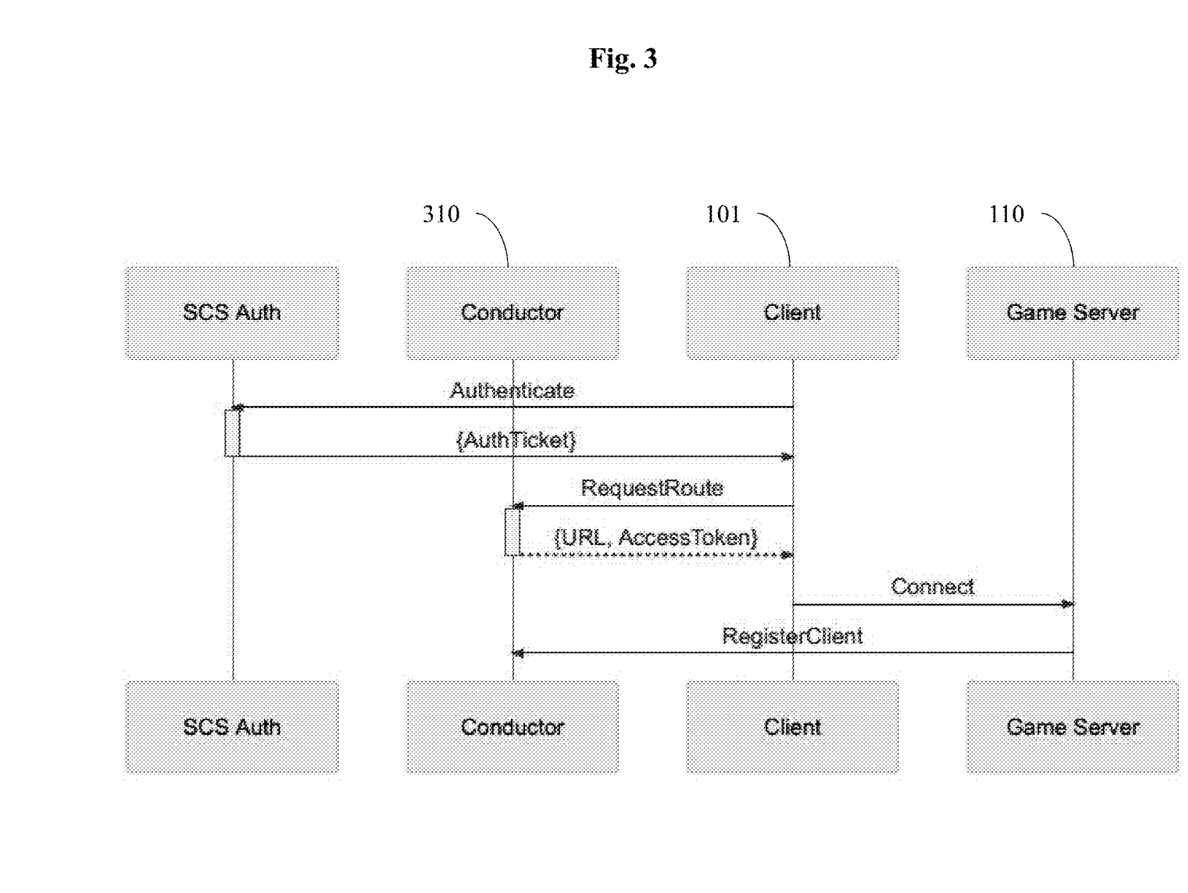
FIG. 3 is an exemplary data flow diagram illustrating one embodiment of a data flow for granting access to the game server of FIG. 1 using a conductor.

In some embodiments, a conductor 310, such as shown in FIG. 3 is responsible for routing client devices 101 to game servers 110 and for granting access to sandbox applications 112. The conductor 310 can be a service hosted in a service stack. Turning to FIG. 3, client devices 101 initiate a connection to a selected sandbox application 112 by contacting the conductor 310 to request access. When a client device 101 wishes to communicate with a game server 110, the client device 101 must first obtain an access token from the conductor 310. An access request can include an authorization ticket and the name of the target sandbox view 113. The conductor 310 validates the authorization ticket and selects the appropriate game server 110 based on one or more routing rules described herein. In some embodiments, the validation includes confirms that the game title (e.g., clients for a title A should not access servers meant for title B), game platform (e.g., clients on a console platform X should not access servers meant for a second console platform Y), player standing (e.g., banned players should not have access to game servers), client type (e.g., console clients should not access servers meant for mobile clients), authentication ticket age (e.g., clients with expired authentication tickets should not have access to game servers), and so on are adhering to their appropriate routing rules. The conductor 310 responds with a URL for the gateway 111 hosting the selected sandbox application 112, and a one-time use access token granting access to the selected sandbox application 112.

The conductor 310 can also maintain a list of client devices 101 that are currently connected to game servers 110. The conductor 310 can notify any game server 110 to remove a selected client device 101 if any security concerns arise. In some embodiments, the conductor 310 can be omitted with deployments of a single game server 110. In other words, the conductor 310 advantageously coordinates communication and transactions amongst more than one game server 110, such as for load balancing and latency reduction.

As discussed above, the conductor 310 routes the client devices 101 by selecting the appropriate game server 110 based on one or more routing rules described herein. Routing rules can depend on whether an application requires long term persistence and/or whether network latency is a concern. For example, applications needing long term persistent data (e.g., an inventory application) require "sticky routing." Similarly, latency-sensitive applications can require regional routing.

"Sticky routing" occurs when long term data persistence is required and the conductor 310 must consistently route a client to the game server 110 on which their data is stored. In some embodiments, the conductor 310 maintains a database that includes, for example, a location in memory of the player's persistent data, a location in memory to which the player was last routed, a time at which the player was last routed, and so on to determine the outcome of any subsequent routing request.

A client device 101 can also request direct routing in the event that the client device 101 knows exactly which game server 110 to which they wish to connect. For example, if a player receives an invite to a multiplayer game, then the player (e.g., the client device 101) must connect to the same physical game server 110 where the game is hosted.

In some cases, the sandbox application 112 is sensitive to network latency. This network latency is often a function of the physical distance between the client device 101 and the game server 110. As such, routing the client device 101 to the game server 110 that is nearest in geographic proximity can help reduce latency.

Figure 4:
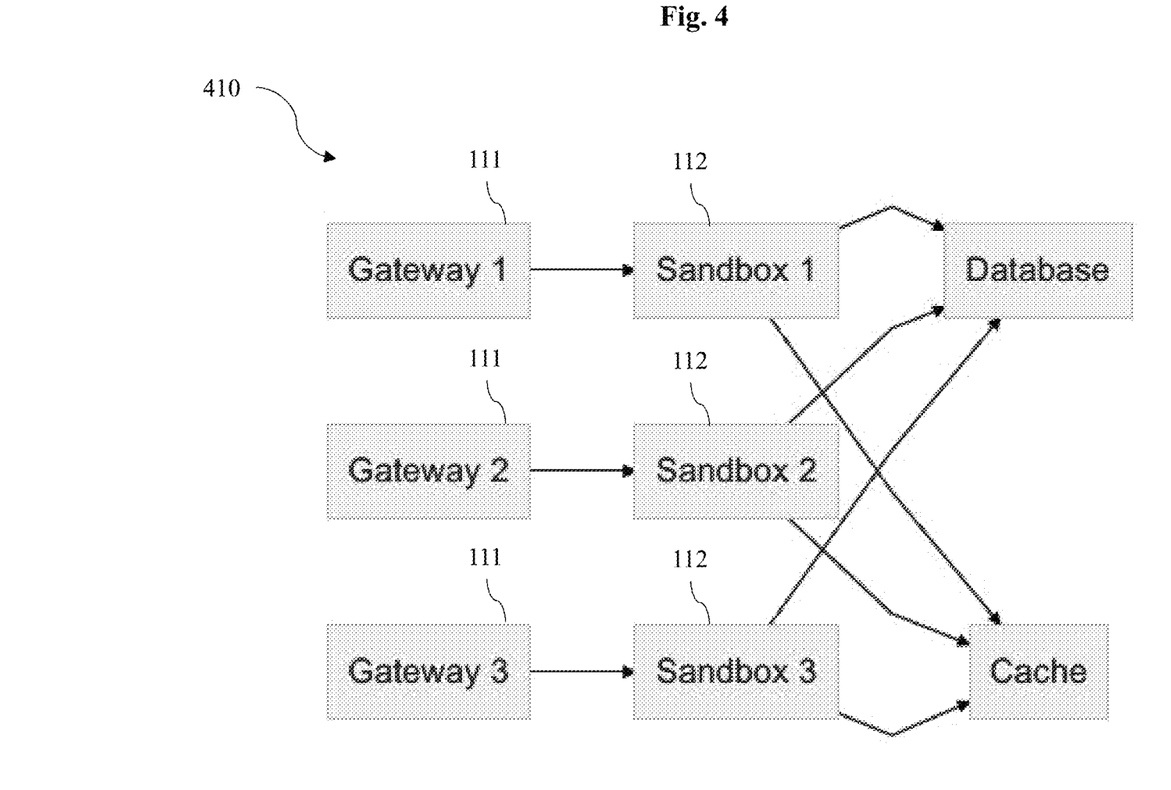
FIG. 4 is an exemplary top-level block diagram illustrating one embodiment of a pod for operating one or more game servers of FIG. 1.

With reference to FIG. 4, a pod 410 is a collection of hardware components required for operating one or more sandbox applications 112 deployed as a single unit. As shown in FIG. 4, the pod 410 includes machines for running gateways and sandboxes, external caches, and databases. Organizing components into pods advantageously provides scaling benefits. In other words, the pod 410 is the unit to be scaled. If more processing power is required, then pod units are deployed to datacenters. If less power is needed, then pods can be reclaimed. One or more pods 410 can be deployed to dedicated hosting datacenters as well as cloud-based datacenters.

Depending on application requirements, the pod 410 can be configured in various methods as desired. For example, some applications require a database while others do not. Similarly, other applications require an external cache. For one application, the pod 410 can include eight gateway servers (not shown). For another application, the pod 410 can include four gateway servers (not shown).

Pod configurations can be flexible. However, once configured, pods are provisioned and deployed as a single unit. In a preferred embodiment, the pod 410 has several gateway servers, but only one database server. Accordingly, the pod 410 is not only a unit of scale, but also a unit of persistence. In other words, when routing clients to a "sticky" sandbox application, the conductor 310 can choose one of several gateway servers within the pod 410. Each gateway within the pod 410 has a dedicated network address (e.g., IP address and URL).

Because all gateways in the pod 410 point to the same database, the data for an individual player (or client device 101) is available to all gateways in the pod 410. However, each client device 101 is connected to a single gateway server at a time. Within the pod 410, all gateway servers can be configured identically. For example, a selected pod 410 can be dedicated to running an inventory application, a poker application, and a backgammon application. In this example, all gateways in the pod 410 are configured to run a gateway process, an inventory sandbox application, a poker sandbox application, and a backgammon sandbox application.

Figure 5:
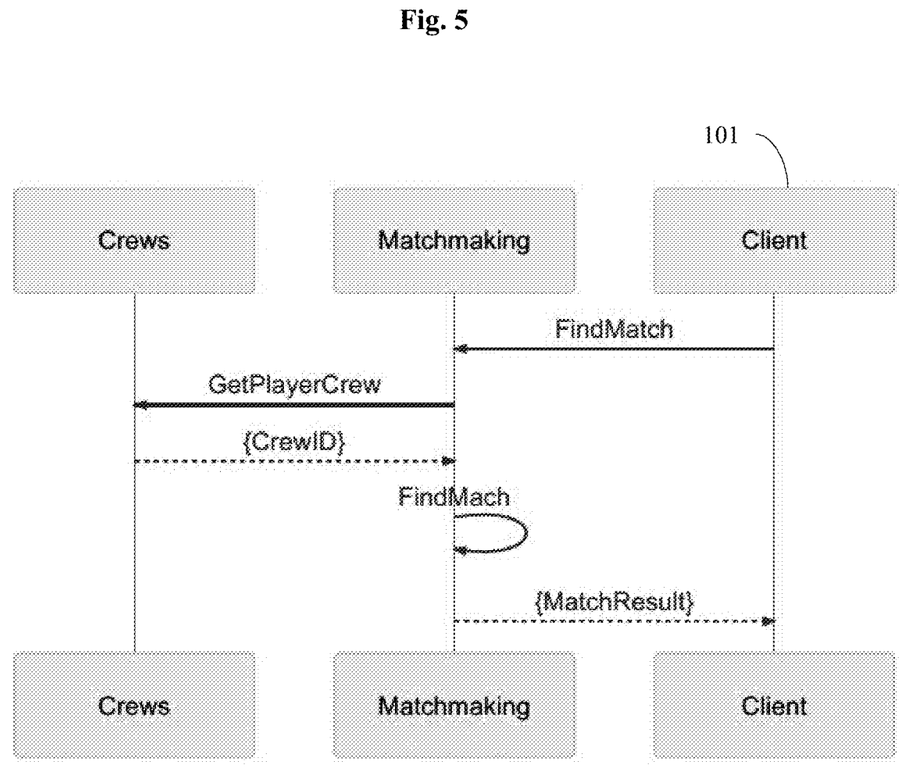
FIG. 5 is an exemplary data flow diagram illustrating one embodiment of a data flow for matchmaking between one or more game servers of FIG. 1.

Sandbox applications 112 can communicate with any number of game services and/or transactions. For example, a multiplayer matchmaking sandbox 112 can communicate with a matchmaking crew service to match up players in the same "crew." As shown in FIG. 5, messaging services can also be used to send invites to players connected to different sandbox applications.

Figure 6:
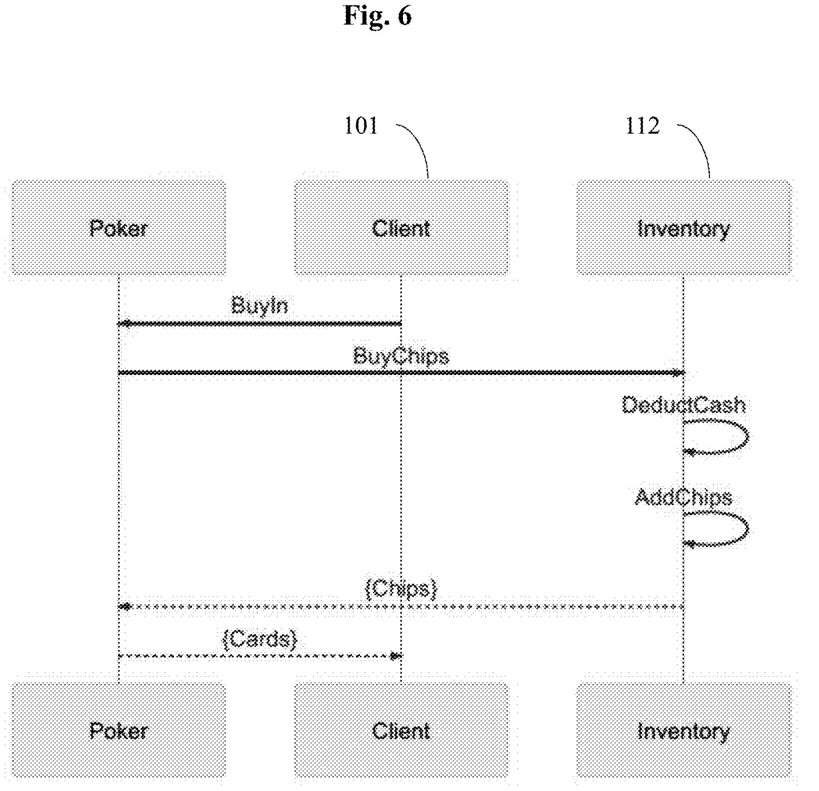
FIG. 6 is an exemplary data flow diagram illustrating one embodiment of a data flow for messaging between one or more game servers of FIG. 1.

Game servers 110 also can communicate with one another via inter-sandbox communication, such as shown in FIG. 6. In the example shown in FIG. 6, if a player connected to a poker sandbox needs to buy poker chips, the poker sandbox can communicate with an inventory sandbox to carry out a "BuyChips" transaction. The conductor 310 locates the sandboxes for inter-sandbox communication.

The relevant game server 110 determines whether a particular transaction for a game device is successful. For example, in order to make a virtual purchase of the poker chips, the client device 101 can connect to an inventory game server. The client device forwards information regarding the virtual purchase (e.g., virtual currency exchanged and item for sale) to the inventory game server. The inventory game server determines whether the virtual purchase is valid and authorizes the transaction.

As another example, a session management game server can be used to manage a group of players who are in the same session. For example, the group of players can be in the same geographic area in the virtual game and/or are in the line-of-sight of one another. If one or more of the group of players wandered out of the geographic area and wanted to join another group of players (e.g., joining a second session and moving out of the current session), each client game device can communicate with the session management game server for determining session management dynamically.

The session management game server alleviates the burden on each client device for session management. Furthermore, the session management game server enables seamless sessioning by allowing the game server to be aware of all global sessions in the virtual environment.

The session management game server can manage one or more sessions, including joining and leaving sessions, in any manner described herein. For example, when joining a session, a game client can request a new session from the server. This can be for any number of reasons (e.g., matchmaking, a specific user request, and so on). The session management game server assigns the game client a new session. The game client leaves its current session (e.g., dropping all peer-to-peer connections) and joins the newly assigned session.

As another example, the session management game server attempts to find players better sessions than the one they are currently in. If the session management game server finds a better session, the session management game server will join the game client to the newly assigned session seamlessly. In some embodiments, a graph-based clustering approach can be used for splitting players. This clustering can be based on distance or other predetermined characteristics. Additional information regarding conventional session management and a novel approach to the same is provided in commonly assigned, co-pending U.S. patent application Ser. No. 15/807,371. Filed on Nov. 8, 2017, entitled "System and Method for Session Management in a Multiplayer Network Gaming Environment," the disclosure of which is hereby incorporated by reference in its entirety and for all purposes.

Game servers 110 can rely on network transport protocols that support RPC. For example, HTTP, Websocket, and so on can be used to support RPC. Above the transport protocol, game servers 110 can encode RPC messages (e.g., such as either JSON or Protocol Buffers). RPC requests include the name of the RPC method to call, as well as parameters to pas to the RPC method. RPC responses include results of calling RPC methods.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A game server system, comprising:
one or more client devices, each having a communications interface and a processor for executing an electronic game file; and
at least two game servers in operable communication with each client device via their communication interface for transmitting remote procedure calls with said client devices; and
a conductor that routes said client devices to said game servers,
wherein a first game server is dedicated to a first selection of domain specific applications of the electronic game file and a second game server is dedicated to a second selection of domain specific applications of the electronic game file being independent of the first selection of domain specific applications, said conductor authorizing access by providing an access token to a selected client device if an authorization ticket can be validated by the conductor when the selected client device requests access to either the first or the second selection of domain specific applications by transmitting to the conductor the authorization ticket including an identifier of the first or second game server.

2. The system of claim 1, wherein each game server includes a gateway representing a network facing server for hosting one or more sandbox applications and routing remote procedure calls from a selected client device to the one or more sandbox applications, and a database.

3. The system of claim 2, wherein the gateway of each game server is identifiable using a network facing address.

4. The system of claim 2, wherein the selected client device maintains a persistent network connection with the gateway of a selected game sever, the database of the selected game server for persistent storage of the selected client device.

5. The system of claim 2, wherein the one or more sandbox applications of each game server supports one or more views for each client device.

6. The system of claim 2, wherein a collection of sandbox applications are deployed as a pod, the pod comprising a collection of hardware components for operating the collection of sandbox applications.

7. The system of claim 1, wherein each game server comprises internal components that are required for to implement core functionality of the electronic game file and external components selected from a group comprising a database server, a cache server, a network switch, a network firewall, or a network load balancer.

8. The system of claim 1, wherein at least one of the first and second selections of domain specific applications comprises an inventory application, a poker application, an anti-cheat application, a bounty application, a session matchmaking application, a social networking application, a messaging application, and an authentication application.

9. The system of claim 1, wherein said one or more client devices comprise gaming consoles.

10. A computer-based method for managing services of an electronic game file, the services being allocated through at least two game servers, a first game server is dedicated to a first sandbox application of domain specific services of the electronic game file and a second game server is dedicated to a second sandbox application of domain specific applications of the electronic game file being independent of the first sandbox application of domain specific applications, the method comprising:
receiving an access request at a conductor from a selected client device to access a selected sandbox application, the selected client device having a communications interface and a processor for executing the electronic game file, the access request comprising an authorization ticket and a name of the sandbox application;
validating the authorization ticket via the conductor, wherein a successful validation causes the transmission of an access token by the conductor to the client device; and
routing the client device via the conductor to the sandbox application based on one or more routing rules upon receipt of the access token by the client device.

11. The computer-based method of claim 10, wherein said routing the client device comprises providing a uniform resource locator for a gateway hosting the sandbox application and a one-time use access token.

12. The computer-based method of claim 10, wherein said validating comprises confirming a game title of the authorization ticket matches with a game title of the electronic game file.

13. The computer-based method of claim 10, wherein said receiving an access request comprises receiving a remote procedure call from the client device.

14. A game server system, comprising:
one or more gaming consoles, each having a communications interface and a processor for executing an electronic game file; and
at least two game servers in operable communication with each gaming console via their communication interface for transmitting remote procedure calls with said client devices; and
a conductor that routes said gaming consoles to said game servers,
wherein a first game server is dedicated to a first selection of domain specific applications of the electronic game file and a second game server is dedicated to a second selection of domain specific applications of the electronic game file being independent of the first selection of domain specific applications, said conductor authorizing access by providing an access token to a selected gaming console if an authorization ticket can be validated by the conductor when the selected gaming console requests the access token to either the first or second selection of domain specific applications by transmitting to the conductor the authorization ticket including an identifier of the first or second game server,
wherein each game server includes a gateway representing a network facing server for hosting one or more sandbox applications and routing remote procedure calls from a selected game console to the one or more sandbox applications, and a database.

15. The system of claim 14, wherein the gateway of each game server is identifiable using a network facing address.

16. The system of claim 14, wherein the selected game console maintains a persistent network connection with the gateway of a selected game sever, the database of the selected game server for persistent storage of the selected game console.

17. The system of claim 14, wherein the one or more sandbox applications of each game server supports one or more views for each game console.

18. The system of claim 14, wherein a collection of sandbox applications is deployed as a pod, the pod comprising a collection of hardware components for operating the collection of sandbox applications.

19. The system of claim 14, wherein each game server comprises internal components that are required for to implement core functionality of the electronic game file and external components selected from a group comprising a database server, a cache server, a network switch, a network firewall, or a network load balancer.

20. The system of claim 14, wherein at least one of the first and second selections of domain specific applications comprises an inventory application, a poker application, an anti-cheat application, a bounty application, a session matchmaking application, a social networking application, a messaging application, and an authentication application.

* * * * *